United States Patent [19]

Hamann

[11] Patent Number: 4,471,390
[45] Date of Patent: Sep. 11, 1984

[54] FLEXIBLE DISKETTE DATA DUPLICATION

[75] Inventor: Robert W. Hamann, Natick, Mass.

[73] Assignee: Dennison Manufacturing Company, Framingham, Mass.

[21] Appl. No.: 392,110

[22] Filed: Jun. 25, 1982

[51] Int. Cl.³ .......................... G11B 5/86; G11B 15/46
[52] U.S. Cl. ......................................... 360/15; 360/73
[58] Field of Search ...................... 360/15, 73, 98, 99; 369/84, 190

[56] References Cited

U.S. PATENT DOCUMENTS 3,805,284  4/1974  Coon, Jr. et al. ..................... 360/15
4,375,655  3/1983  Korth et al. .......................... 360/15

Primary Examiner—Vincent P. Canney
Attorney, Agent, or Firm—Arthur B. Moore

[57] ABSTRACT

Apparatus for bit-by-bit duplication of data stored on a flexible diskette. A master disk is driven by a conventional DC drive, which provides a feedback control voltage responsive to the instantaneous speed of the master disk. A slave disk is driven from external index synchronization circuitry, which receives signals from the respective disk drives indicative of the angular position of the diskettes, and additionally receives the master drive control voltage. The index synchronization circuitry outputs a motor error correction voltage to the slave disk drive, thereby coordinating the rotation of the respective diskettes. Bits are copied only when the slave disk drive parameters fall within a narrowly defined window.

10 Claims, 9 Drawing Figures

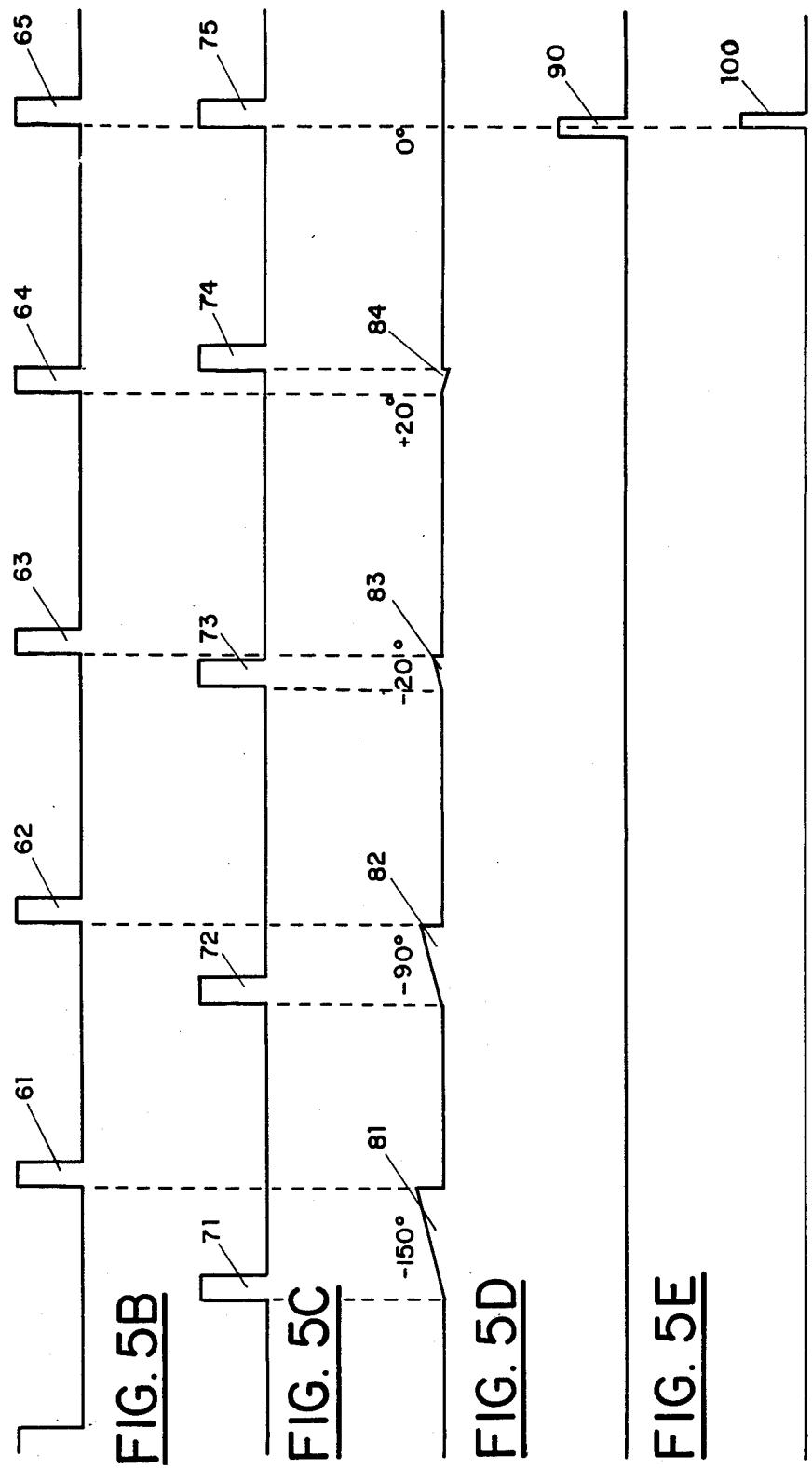

FLEXIBLE DISKETTE DATA DUPLICATION

BACKGROUND OF THE INVENTION

The present invention relates to data storage on flexible diskettes, and more particularly to apparatus for controlling the duplication of data stored on flexible diskettes.

There are a number of commercially available systems for copying magnetically encoded data stored on flexible diskettes, also known as "floppy disks". Such disks are similar in appearance to 45 RPM phonograph records, and typically include a small "index" hole at one radius. The prior art data duplication control systems usually operate by feeding the information stored on a master diskette to a computer, which also receives signals indicative of the speed and phase of the master disk. The computer then manipulates this information to electronically control the drive of one or more slave diskettes, which receive the bits to be copied from the master diskette. Such systems involve large, expensive data processing equipment, which represents a significant expense to the user.

Another technique which has been tried with very limited success is the mechanical coupling of the master and slave disk drives. This approach suffers the shortcoming that conventional disk drives operate within speed tolerances on the order of several percent, which introduces an inherent error in such mechanical coordination.

Accordingly, it is a principal object of the invention to provide simple, inexpensive apparatus for copying the information stored on flexible diskettes. A particular object is the provision of apparatus for this purpose which is relatively simple and of low cost.

Another object of the invention is the achievement of reliable data duplication, despite the normal error encountered in conventional diskette drives.

A further object is the design of data duplication apparatus which is compatible with conventional flexible diskette drives.

SUMMARY OF THE INVENTION

In furthering the above and related objects, the invention provides method and apparatus for bit-by-bit duplication of the information magnetically encoded on a flexible diskette. This is achieved by direct transfer of recorded data from disk to disk, while electronically coordinating the rotation of master and slave disks. In the preferred embodiment of the invention, the master and slave disks are driven by DC motor drives. The master drive is a conventional system, while the slave drive omits internal speed control circuitry and receives a control signal from phase synchronization circuitry in accordance with the invention.

A principal aspect of the invention is seen in the use of a feedback control voltage from the master disk drive as an input to the phase synchronization circuitry. This circuitry also receives signals indicative of the angular orientation of the master and slave disks. The phase synchronization circuitry processes this information on a cycle-by-cycle basis to provide an error correction voltage to the slave disk drive.

Another aspect of the invention relates to waveform analysis of the phase synchronization circuitry. In the preferred embodiment, this circuitry outputs a negative or positive ramp voltage as a linear function of the angle by which the master drive lags or leads the slave. This ramp voltage provides an error correction signal which is summed with the master motor control voltage to derive a slave motor control signal. This process achieves a damped oscillatory correction of the slave disk rotation.

A further aspect of the invention is the design of control circuitry for the disk drive and data transfer functions, timed by a SYSTEM CLOCK signal. The clock signal provides a control timing function which is indexed only when the phase relationship of the respective disk drive falls within a narrowly defined window. This ensures reliable data duplication despite incidental variances in the speed of the master disk drive.

BRIEF DESCRIPTION OF THE DRAWINGS

The above and additional aspects of the invention are illustrated with reference to the detailed description which follows, taken in conjunction with the drawings in which:

FIG. 5A is a time plot of an illustrative master index pulse train;

FIG. 5B is a time plot of an illustrative slave index pulse train;

FIG. 5C is a time plot of an index error correction waveform, for the master and slave index waveforms of FIGS. 5A and 5B;

FIG. 5D is a time plot of an index synchronization pulse for the index waveforms of FIGS. 5A and 5B; and FIG. 5E is a time plot of a SYSTEM CLOCK pulse.

DETAILED DESCRIPTION

FIGS. 1-5 illustrate a system for duplicating data stored on flexible diskettes in accordance with a preferred embodiment of the invention. The data duplication circuits of the invention are illustrated in conjunction with conventional DC disk drives, commonly employed in the processing of 5.25 inch diskettes. Such disk drives incorporate some form of feedback control to maintain rotational speed at or near a value set by the user; a typical value is 300 rpm. Disk speed is maintained at the chosen value within certain tolerances—illustratively on the order of 5-10 percent. For example, the disk drive may use a pulse width modulator to establish an error voltage which is proportional to pulse width. This voltage would be compared to a threshold value in accordance with the selected rotational speed, and a corrected drive voltage would then be fed back to the DC drive motor. Such apparatus also includes some means of monitoring the angular orientation of the disk—typically, a photoelectric sensor which periodically detects an index hole in the disk. An advantageous characteristic of the apparatus of the invention is that it utilizes these conventionally generated signals as input to the control circuitry detailed below. Although copying from a single master to a single slave diskette is assumed for illustrative purposes, the apparatus of the invention could be easily extended to a plurality of slave diskettes.

Figure 1:
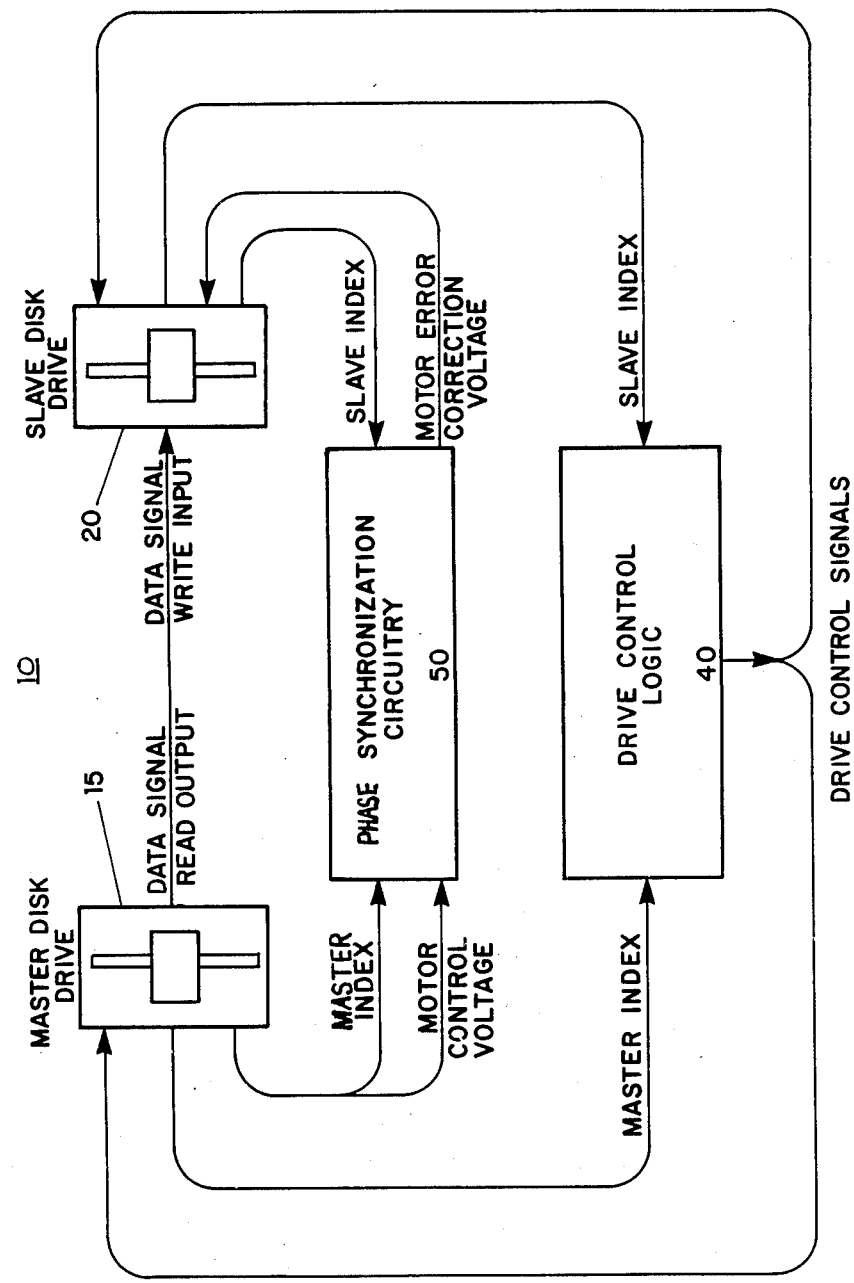
FIG. 1 is a block schematic diagram of disk drive control circuitry in accordance with a preferred embodiment of the invention.

FIG. 1 gives a functional block diagram of data duplication apparatus 10 for flexible diskettes according to the invention. Data is written from a disk stored on a master disk drive 15 to a disk stored on a slave disk drive 20. Such duplication occurs, however, only when the drive control logic 40 outputs a WRITE ENABLE signal. This signal occurs only during certain conditions of the Phase Synchronization Circuitry 50, as described below. The apparatus of FIG. 1 achieves a bit-by-bit duplication of the data stored on the master disk, at a rate defined by the drive control logic 40. The phase synchronization circuitry 50 receives as input from master drive 15 the Motor Control Voltage and Index signals described above, and similarly receives an Index signal from the slave disk drive 20. The Phase Synchronization Circuit 50 processes these signals, and outputs a Motor Error Correction Voltage to the slave disk drive 20. Thus, the master drive includes the conventional error correction circuitry previously described, but the slave disk drive 20 omits the prior art error correction circuit, and substitutes for it the Phase Sync Circuitry 50. As explained below, the Sync Circuitry 50 is designed to provide a cycle-by-cycle oscillatory correction of any phase differential detected between the master and slave disks.

Figure 2:
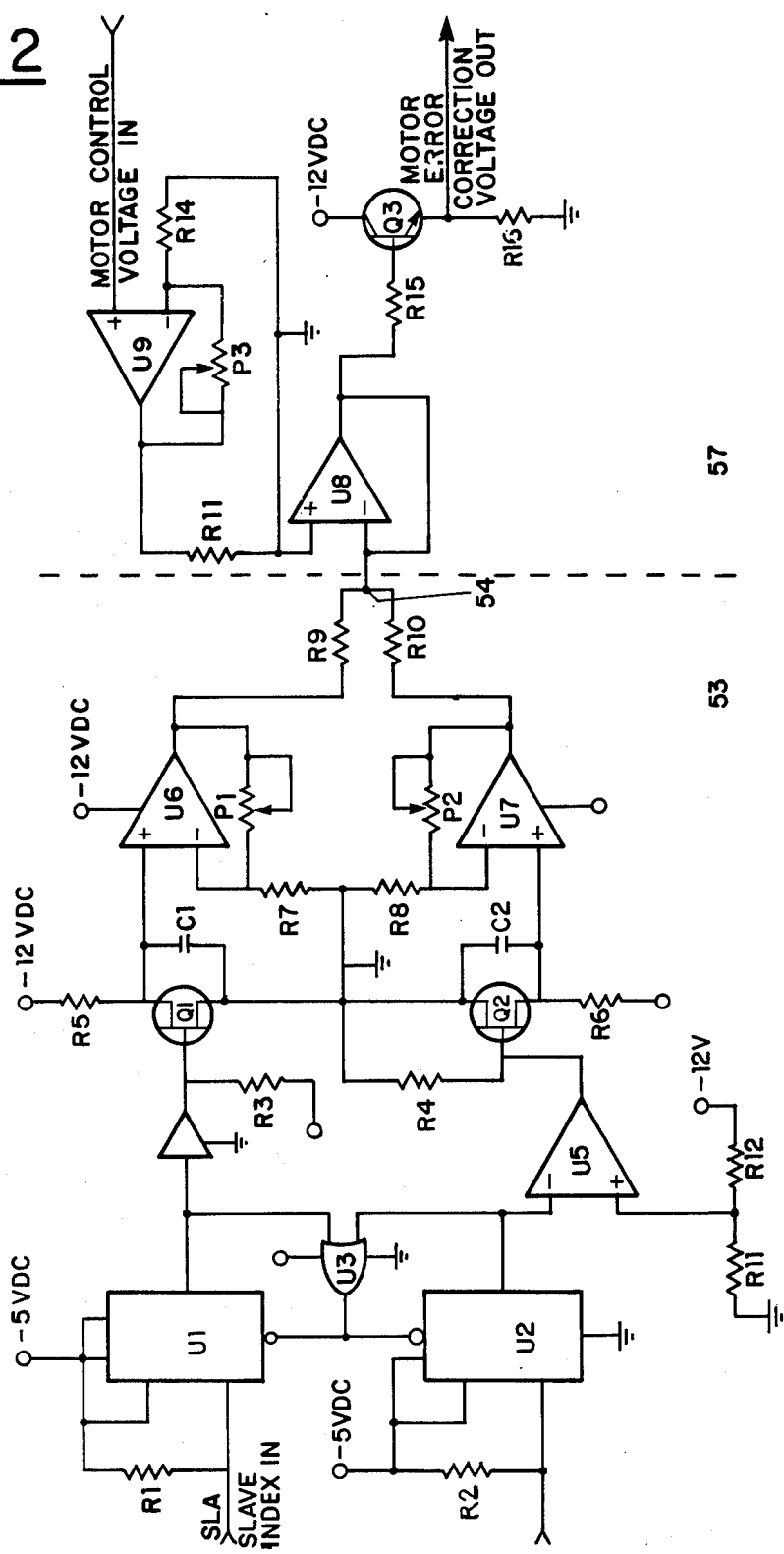
FIG. 2 is a circuit schematic diagram of a preferred design of phase synchronization circuitry for the apparatus of FIG. 1.

FIG. 2 is a schematic diagram of illustrative Phase Synchronization Circuitry 50 for the data duplication apparatus 10 of FIG. 1. Phase Synchronization Circuitry 50 may be subdivided into two sections, the first being a section 53 for processing index signals from the respective disk drives to produce an Index Error Correction signal, as described below. The second, right hand portion of the circuit 57 processes the Motor Control Voltage from the master drive, modifying it at differential amplifier U8 in accordance with any Index Error Correction signal. In the absence of any error correction signal, circuit 57 simply acts as a loop to provide a motor error correction voltage to the slave drive matching the motor control signal from the master drive. In this event, no signal is received at the negative input of differential operational amplifier U8. Op amps U9, U8 and transistor Q3 will act as loops with gains chosen to provide an output to the slave drive equal to the typically several volt input control signal from the master drive. Thus, circuitry 57 will cause the slave drive to follow the rotational pattern of the master drive, speeding up or slowing down generally in synchronization therewith. Circuit 53 provides a fine tuning control by keeping the respective diskettes in phase.

In subcircuit 53, Flip Flops U2 and U1 receive Index signals from the master and slave disk drives, respectively. At the beginning of a given disk rotation cycle, flip flops U1 and U2 will have been reset to provide a positive output at terminal Q (using negative logic). When the earlier of the two Index signals is received by one of the flip flops, its output goes low, initiating a ramp voltage, as explained below. Upon receipt of the later Index signal, the other flip flop will also go low, clearing both flip flops via OR gate U3, and thereby terminating the ramp voltage generated by the remainder of circuit 53. Circuit 53 includes a pair of field effect transistors Q1 and Q2 which in combination with capacitor-resistor pairs C1, R5 and C2, R6 provide ramp voltages during the period of any actuated signal from one of the respective flip flops U1 and U2. In the event that the Slave Index leads the Master Index, the upper circuitry will provide a positive ramp voltage of duration and amplitude determined by the lagging Master Index. Alternatively, if the Master Index leads the Slave Index, the lower circuitry will provide a negative ramp voltage terminated by the lagging Slave Index. The RC circuit values are chosen to use the most linear part of the capacitor characteristic in providing a time constant which is correlated to the disk rotation period. Feedback operational amplifier U6 and U7 with potentiometer P1 and P2 provide compensating gains to achieve a desired signal level at the summing point 54.

Figure 4:
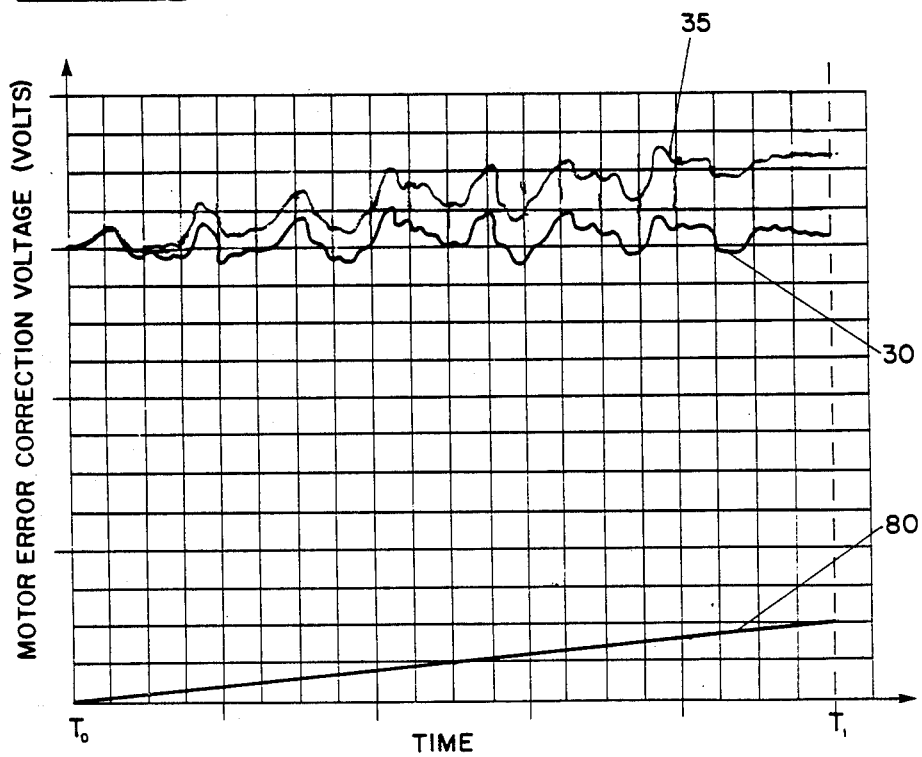
FIG. 4 is a time plot illustrating the summing of the master control voltage and error correction voltage waveforms.

With reference to the time plots of FIG. 4, curve 30 depicts an illustrative master Control Voltage waveform over a portion of a disk rotation period. This waveform is characterized by high frequency fluctuation attributable to factors such as drive tolerances, torque characteristics of the disks, and frictional effects of the disk jackets. Curve 80 depicts an illustrative positive going Index Error Correction signal. With further reference to FIG. 2, signals 30 and 80 are received at the positive and negative inputs respectively of differential operational amplifier U8, which provides an output voltage proportional to the sum of these signals. This is used to derive the Motor Error Correction Voltage, plotted as 35 in FIG. 4, which is routed to the slave disk drive 20 (FIG. 1).

In the typical operation of Phase Synchronization Circuitry 50, several disk rotation periods may be required to bring the slave drive 20 back into phase with the master drive 15, depending upon the angle by which the latter lags or leads the former. FIGS. 5A, 5B, and 5C illustrate the error correction waveforms resulting from the Slave Index initially lagging the Master Index by 150°. During the first disk rotation cycle this results in Index Error Correction signal 81. During the next period the phase difference between the disk drives has been reduced to 90°, resulting in ramp voltage 82. Subsequent Index Error Correction signals 83, 84 correspond to a phase lag of 20°, and a phase lead of 20°. Thus, circuit 50 provides a damped oscillatory correction resulting in an essentially in-phase characteristic at the fifth period. At this point, as shown in FIG. 5E, the drive control logic 40 will provide an output pulse 100 acting as a clock signal, as explained below. In the extreme case of Master and Slave Indices out of phase by 180°, the illustrated circuit requires on the order of 5 cycles to achieve a clock signal.

Figure 3:
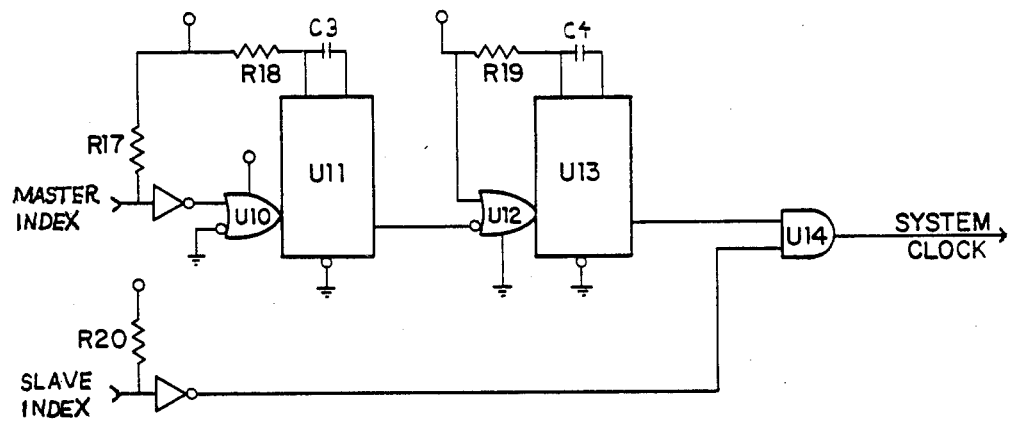
FIG. 3 is an illustrative design of control timing logic for the apparatus of FIG. 1.

The schematic diagram of FIG. 3 depicts an illustrative circuit 120 (part of Control Logic 40) for generating a System Clock signal in response to a given relationship of the Master and Slave Index signals. FIG. 5A gives an exemplary circuit pulse train corresponding to a Master Index signal repeating periodically at around 200 milliseconds, with a pulse width of 1.5 milliseconds. One-shot U11 is actuated by the Master Index to provide an output signal of 199.5 milliseconds, which in turn is fed to one shot U13. One shot U13 in turn outputs an Index Synchronization Window 90 having a pulse width of 1.0 milliseconds, which is centered on the leading edge of the Master Index signal 65 (FIG. 5D). AND gate U14 compares the Index Synchronization Window with the slave index signals, and thereby provides a positive output only when the leading edge of the slave index falls within the Index Synchronization Window. Therefore AND gate U14 provides a System Clock pulse only during the period of coincidence of the Index Synchronization Window and slave index, if any—See FIG. 5E. This System Clock signal paces the remaining electronic functions of the data duplication system 10, including the reading of bits from the Master diskette and writing of these bits onto the slave diskette (FIG. 1). A System Clock pulse width which is only a minute fraction of the Index Synchronization Window will suffice to actuate these functions.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims. In particular, the principles of the foregoing disclosure may be extended to duplicating data stored on flexible disks using alternating current disk drives. The system of FIG. 1 would use AC motors in disk drives 15 and 20, and the phase synchronization circuitry 50 and drive control logic 40 would be modified to employ a narrower Index Synchronization Window 90.

I claim:

1. In combination with disk drives for rotating magnetically encodable master and slave disks subject to electronic control, means for producing a master control signal essentially representative of the instantaneous angular velocity of the master disk to control the rotation thereof, means associated with each disk drive for producing an index signal at a given angular position of the disk, and means for copying data stored on the master disk onto at least one slave disk:

apparatus for controlling the copying of data, comprising means for producing a slave control signal representative of the master control signal, modified by said master and slave indices;

means for adjusting the angular velocity of the slave disk in accordance with said slave control signal; and means for actuating the data copying means only when said master and slave indices have a predetermined relationship.

2. Apparatus as defined in claim 1, further comprising means for producing an error signal proportional to any phase differential between the master and slave indices, wherein the slave control signal is representative of the master control signal, modified by said error control signal.

3. Apparatus as defined in claim 2 wherein the error control signal comprises a ramp signal of amplitude and duration determined by said phase differential.

4. Apparatus as defined in claim 3 wherein the slave control signal is representative of the sum of the master control signal and the ramp signal.

5. Apparatus as defined in claim 2 wherein the error control signal is produced once during each rotation cycle of the master disk.

6. Apparatus as defined in claim 2 wherein said error signal is initiated by the earlier of the master and slave indices, and terminated by the later of the master and slave indices.

7. Apparatus as defined in claim 1 wherein the means for actuating the data copying means detects any phase differential between the master and slave indices, and actuates the data copying means only when the phase differential falls below a predetermined value.

8. Apparatus as defined in claim 1 wherein the master and slave indices comprise pulse trains.

9. Apparatus as defined in claim 8 wherein said actuating means comprises:

means for producing an index synchronization pulse centered on a given edge of the master index pulse; and means for actuating the data copying means only when the corresponding edge of the slave control pulse falls within said index synchronization pulse.

10. Apparatus as defined in claim 9 wherein said index synchronization pulse and master control pulse are of comparable durations.

* * * * *